Patented Mar. 22, 1938

2,111,768

UNITED STATES PATENT OFFICE 2,111,768

PREPARATION OF P-(BENZYLAMINO) BENZENESULPHONAMIDES

Paul Emile Charles Goissedet and Robert Ludovic Despois, Choisy Le Roi, France, assignors to Societe des Usines Chemiques Rhone-Poulenc, Paris, France No Drawing. Application July 2, 1936, Serial No. 88,592. In Great Britain February 18, 1936

5 Claims. (Cl. 260—128)

The present invention relates to the preparation of a new group of aromatic compounds.

The object of the invention is the preparation of new compounds of valuable bactericidal properties.

The compounds forming the subject of the present invention are derivatives of p-aminobenzenesulphamide, substituted in the amino group by an aralkyl group. The compounds may contain further substituents in the nucleus, as for example, hydroxyl groups or sulphonic acid groups; in the latter case, the compounds are soluble in water. The presence of the aralkyl subsitutent in the amino group of p-aminobenzenesulphamide considerably increases the bactericidal activity of the p-aminobenzenesulphamide and enables stable compounds to be obtained having good therapeutic properties.

According to the present invention these compounds are obtained by substituting the amino group of p-aminobenzenesulphamide by the aralkyl group by either of two methods, namely, by causing the aralkyl halides (which may be substituted in the nucleus or not) to react on p-aminobenzenesulphamide, or by causing p-aminobenzenesulphamide to condense with an aromatic aldehyde and then hydrogenating the resulting Schiff's base in the presence of a suitable catalyst.

The following examples illustrate how the invention may be carried out in practice, but it is to be understood that the invention is in no way limited to the details given in these examples:—

Example 1

130 grams of p-benzylidine-aminobenzenesulphamide are dissolved in 1300 cc. of dioxane and hydrogenated at 50° C. in the presence of active nickel. When the absorption of hydrogen is finished the catalyst is separated by filtration and the filtrate evaporated to dryness. The residue is recrystallized from alcohol.

p-Benzylaminobenzenesulphamide is thus obtained in a nearly theoretical yield in the form of almost colourless crystals melting at 175° C.

Example 2

34.4 grams of p-aminobenzenesulphamide are dissolved in 500 cc. of boiling water, 20 grams of calcium carbonate, and 12.7 grams of benzyl chloride, are added and the mixture heated to boiling with stirring for 3 hours. The product is acidified by hydrochloric acid and the p-benzyl-aminobenzenesulphamide which is precipitated is separated by filtration. By recrystallization from acetone the same product as that obtained in Example 1 is obtained in almost theoretical yield.

Example 3

10 grams of p-(o-hydroxybenzylidine-amino)-benzenesulphamide are dissolved in 200 cc. of dioxane and hydrogenated at ordinary temperature in the presence of active platinum; after absorption of the theoretical quantity of hydrogen the catalyst is separated by filtration and the filtrate is evaporated. The residue is recrystallized from 50% alcohol; p-(o-hydroxybenzylamino)benzenesulphamide is obtained in very good yield in the form of white needles melting at 183° C.

Example 4

13.8 grams of p-(p-hydroxybenzylidine-amino)benzenesulphamide are dissolved in 300 cc. of dioxane and hydrogenated in the presence of active nickel at ordinary temperature. After absorption of the theoretical quantity of hydrogen, the catalyst is separated by filtration, the filtrate is evaporated to dryness and the residue is recrystallized from acetone.

p-(p-Hydroxybenzylamino)benzenesulphamide is thus obtained in almost theoretical yield in the form of colourless crystals melting at 206° C.

Example 5

20.8 grams of the sodium salt of benzaldehyde-m-sulphonic acid and 20.85 grams of the hydrochloride of p-amino-benzenesulphamide are dissolved in 500 cc. of water. This solution is hydrogenated at ordinary temperature in the presence of platinum. After filtering off from the catalyst there is obtained by evaporation of the solution the sodium salt of p-(m-sulphobenzyl-amino)benzenesulphamide.

What we claim is:—

1. The new bactericidal compounds of the general formula:

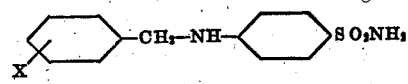

where X represents a member of the group consisting of H, OH, and SO₃H.

2. The new bactericidal compound p-benzyl-aminobenzenesulphamide.

3. The new bactericidal compound p-(o-hydroxylbenzylamino)benzenesulphamide.

4. The new bactericidal compound the sodium salt of p-(m-sulphobenzylamino)benzenesulphamide.

5. A process for the preparation of new aromatic compounds consisting in causing a benzyl halide to react with p-aminobenzenesulphamide.

PAUL EMILE CHARLES GOISSEDET.
ROBERT LUDOVIC DESPOIS.